United States Patent
Kobayashi et al.

(10) Patent No.: US 8,020,749 B2
(45) Date of Patent: *Sep. 20, 2011

(54) DISSIMILAR METAL JOINING METHOD

(75) Inventors: Kojiro Kobayashi, Osaka (JP); Akio Hirose, Osaka (JP); Shigeyuki Nakagawa, Kanagawa (JP); Kenji Miyamoto, Kanagawa (JP); Minoru Kasukawa, Tokyo (JP); Masayuki Inoue, Yokohama (JP); Tetsuji Morita, Kanagawa (JP)

(73) Assignees: Nissan Motor Co., Ltd., Yokohama-shi (JP); Kojiro Kobayashi, Takatsuki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,421

(22) Filed: Nov. 11, 2010

(65) Prior Publication Data

US 2011/0100962 A1    May 5, 2011

Related U.S. Application Data

(62) Division of application No. 11/301,115, filed on Dec. 13, 2005, now Pat. No. 7,850,059.

(30) Foreign Application Priority Data

Dec. 24, 2004  (JP) ................................. 2004-373381
Dec. 24, 2004  (JP) ................................. 2004-373389
Dec. 24, 2004  (JP) ................................. 2004-373400

(51) Int. Cl.
  B23K 1/00       (2006.01)
  B23K 1/002      (2006.01)
  B23K 1/008      (2006.01)
(52) U.S. Cl. .................... 228/178; 228/193; 228/262.41; 228/262.5
(58) Field of Classification Search .................. 228/178, 228/19, 262.41, 262.5
  See application file for complete search history.

(56) References Cited

U.S. PATENT DOCUMENTS

2004/0048096 A1   3/2004  Doh et al.
2004/0262269 A1  12/2004  Matillie

FOREIGN PATENT DOCUMENTS

| JP | 59-225893 A | 12/1984 |
| JP | 1-154886 A | 6/1989 |
| JP | 04-127973 A | 4/1992 |
| JP | 4-251676 A | 9/1992 |
| JP | 5-65272 B2 | 9/1993 |
| JP | 06-039558 A | 2/1994 |
| JP | 7-155964 A | 6/1995 |
| JP | 9-122924 A | 5/1997 |
| JP | 2001-252777 A | 9/2001 |
| JP | 2002-241962 A | 8/2002 |
| JP | 3335036 B2 | 8/2002 |
| JP | 2004-122171 A | 4/2004 |
| WO | WO 03-022511 A1 | 3/2003 |

OTHER PUBLICATIONS

"Aluminum and Aluminum Alloy Sheets and Plates, Strips, and Coiled Sheets", JIS (Japanese Industrial Standard) H 4000, 1999, pp. 829-903. "Cold-reduced Carbon Steel Sheets and Strip", JIS (Japanese Industrial Standard) G 3141, 1996, pp. 291-314.
"Hot-dip Zinc-coated Steel Sheets and Coils", JIS (Japanese Industrial Standard) G 3302, 1998, pp. 315-365.
"Specimen Dimensions and Procedure for Shear Testing Resistance Spot and Embossed Projection Welded Joints", JIS (Japanese Industrial Standard) Z 3136, 1999, pp. 786-791.
M. Fujii et al., "YAG Laser Welding of Dissimilar Metal (Aluminum Alloy and Mild Steel)", Preprints of National Meeting of Japan Welding Society, vol. 61, 1997, pp. 380-381.

*Primary Examiner* — Jessica L Ward
*Assistant Examiner* — Erin Saad
(74) *Attorney, Agent, or Firm* — Foley & Lardner LLP

(57) ABSTRACT

According to a metal joining method of the present invention, first and second dissimilar metals are joined together by interposing between the first and second metal materials a third metal material dissimilar to the first and second metal materials and causing eutectic melting at least either at an interface between the first and third metal materials or at an interface between the second and third metal materials.

6 Claims, 8 Drawing Sheets

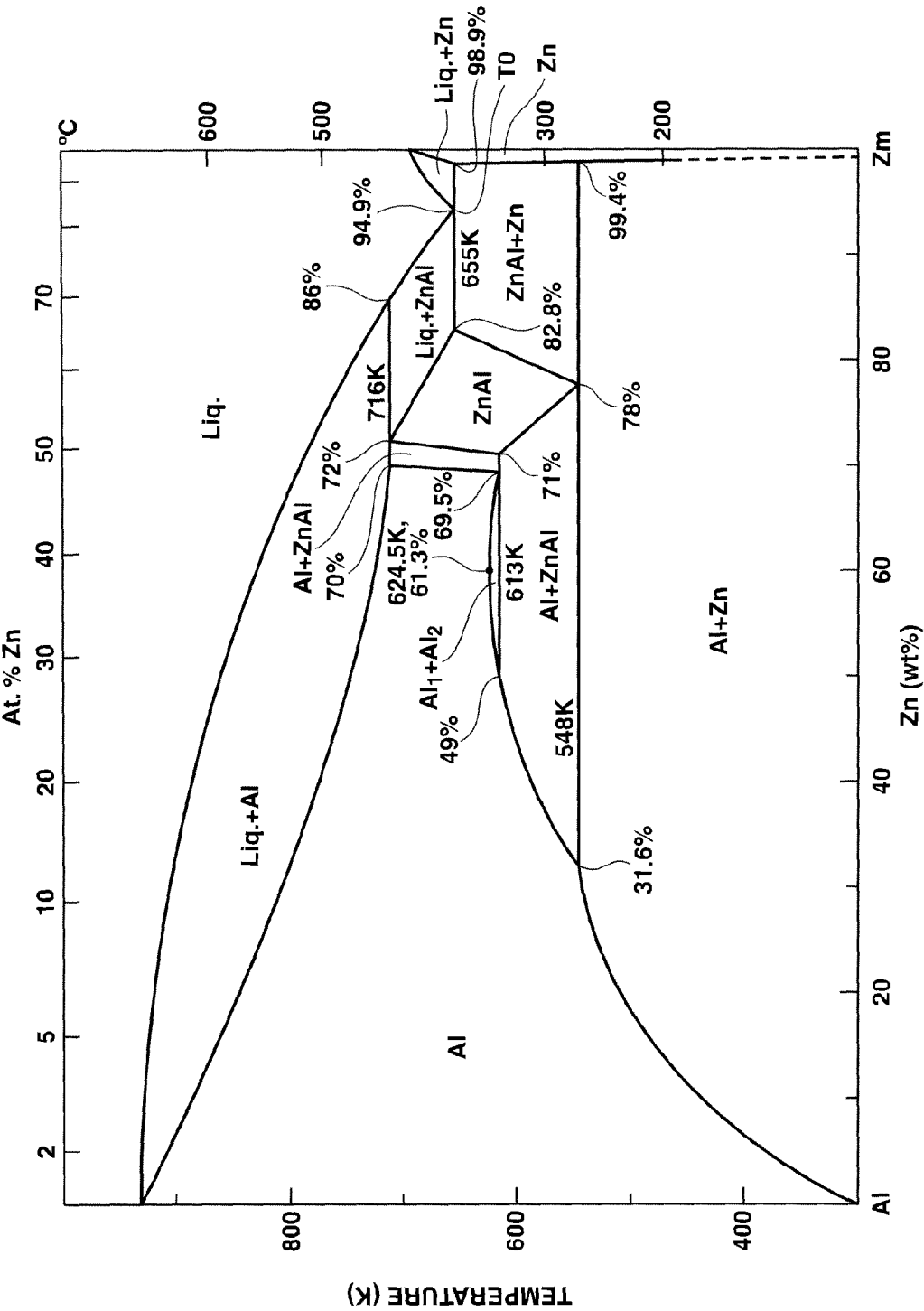

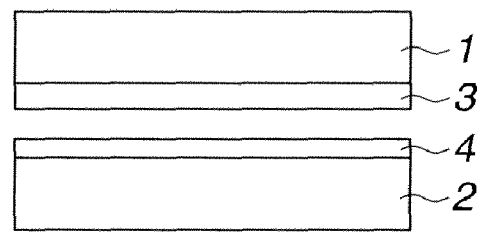
FIG.4A
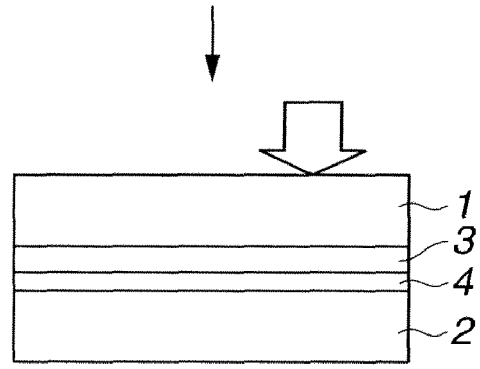
FIG.4B
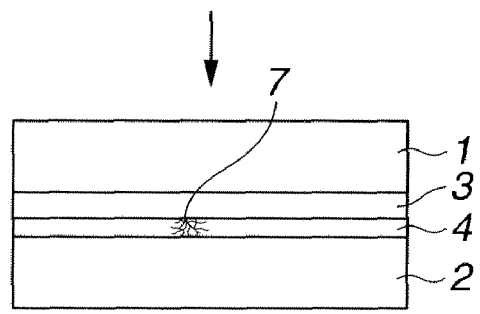
FIG.4C
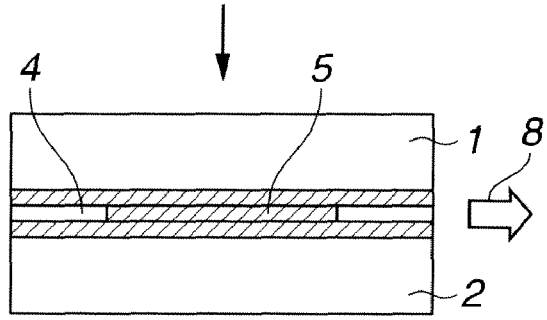
FIG.4D
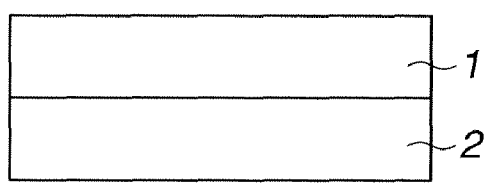
FIG.4E

DISSIMILAR METAL JOINING METHOD

This application is a divisional application of U.S. application Ser. No. 11/301,115, filed Dec. 13, 2005, which claims priority to Japanese Application Nos. 2004-373381, 2004-373389, 2004-373400, all filed Dec. 24, 2004. All of which are hereby incorporated by reference in their entirety.

BACKGROUND OF THE INVENTION

The present invention relates to a dissimilar metal joining method that utilizes eutectic bonding.

In the case of joining two dissimilar metal materials together in the same way as in the case of joining similar metal materials, intermetallic compounds are often formed at a joint between the dissimilar metal materials. For example, hard, brittle intermetallic compounds such as $Fe_2Al_5$ and $FeAl_3$ are formed when a steel material and an aluminum alloy material are welded to each other. It is thus desirable to limit the formation of the intermetallic compounds during the welding in order to secure a sufficient joint strength between the metal materials. Herein, the aluminum alloy material has a closely packed, solid oxide film at a surface thereof. Although the oxide film can be removed through the application of a large amount of heat, the intermetallic compounds grow in thickness by such high heat application and cause a weakening of the joint between the metal materials.

For these reasons, it is common practice to join dissimilar metals by mechanical fastening means such as bolts or rivets even though the mechanical fastening means however raises a problem of increases in weight and cost. It is conceivable to join dissimilar metals by friction pressure welding. However, the applicability of the friction pressure welding is limited to the joining of symmetrical rotary members. It is further conceivable to join dissimilar metals by explosion welding or hot rolling, but the explosion welding and the hot rolling are not preferred in view of the process equipment and efficiency.

In order to solve the above problems, various improvements have been made to dissimilar metal welding processes. Japanese Laid-Open Patent Publication No. 4-127973 (hereinafter abbreviated as "JP 4-127973") proposes a process in which dissimilar metals are joined together by preparing a clad metal material consisting of two metals of the same kinds as the respective dissimilar metals, interposing the clad metal material between the dissimilar metals in such a manner that the metals of the same kind come into contact, and then, resistance welding these metals to each other. Japanese Laid-Open Patent Publication No. 6-039558 (abbreviated as JP 6-039558) proposes a process in which a steel material and an aluminum alloy material are joined together by plating a surface of the steel material facing the aluminum alloy material with an aluminum alloy containing 20 wt % or greater or pure aluminum and resistance welding the aluminum plating layer to the aluminum material with little melting of the steel material. Japanese Laid-Open Patent Publication No. 2001-252777 (hereinafter abbreviated as "JP 2001-252777") and Preprints of National Meeting of Japan Welding Society (vol. 61, pp. 380, 1997) propose processes in which dissimilar metals are welded together by irradiating a YAG laser from one metal side in such a manner as to control base metal diffusion and weld metal composition and to limit the formation of intermetallic compounds between the dissimilar metals.

SUMMARY OF THE INVENTION

The metal joining process of JP 4-127973 includes some additional process steps for e.g. interposing/holding the clad metal material between the dissimilar metals, so that there arises a need to install new equipment in the existing resistance welding line. In addition, it is not easy to produce the clad metal material with stable performance at low cost because the clad metal material itself has two dissimilar metals joined together. The metal joining process of JP 6-039558 needs a large amount of heat to be applied to remove a surficial oxide film from the aluminum alloy material during the resistance welding and unavoidably causes the formation of fragile intermetallic compounds between the aluminum plating layer and the steel material due to high heat application. The joint between the steel material and the aluminum material becomes weakened by the intermetallic compounds as mentioned above. The metal joining processes of JP 2001-252777 and Preprints of National Meeting of Japan Welding Society have a very narrow range of welding conditions to limit the formation of the intermetallic compounds and secure a sufficient level of joint strength between the metals and are difficult to put into practical use.

It is therefore an object of the present invention to provide a method for joining dissimilar metal materials firmly by removing an oxide film from a joint interface between the metal materials while limiting the formation of intermetallic compounds during the joining.

According to a first aspect of the present invention, there is provided a method for joining first and second dissimilar metal materials, comprising: interposing between the first and second metal materials a third metal material dissimilar to the first and second metal materials; and causing eutectic melting at least either at an interface between the first and third metal materials or at an interface between the second and third metal materials.

According to a second aspect of the present invention, there is provided a method for joining first and second dissimilar metal materials, comprising: interposing between the first and second metal materials a third metal material dissimilar to the first and second metal materials; and causing eutectic melting at least either at an interface between the first and third metal materials or at an interface between the second and third metal materials by irradiating a high-energy beam in such a manner as to form a spot of the beam on one of the first and second metal materials.

According to a third aspect of the present invention, there is provided a method for joining first and second dissimilar metal materials, comprising: interposing between the first and second metal materials a third metal material dissimilar to the first and second metal materials; and causing eutectic melting at least either at an interface between the first and third metal materials or at an interface between the second and third metal materials by resistance spot welding.

The other objects and features of the invention will also become understood from the following description.

BRIEF DESCRIPTION OF THE DRAWINGS

FIG. 3 is a phase diagram of an aluminum-zinc binary system.

FIGS. 4A to 4E are schematic views showing how a dissimilar metal joining process proceeds according to a first embodiment of the invention.

DESCRIPTION OF THE EMBODIMENTS

Figure 1:
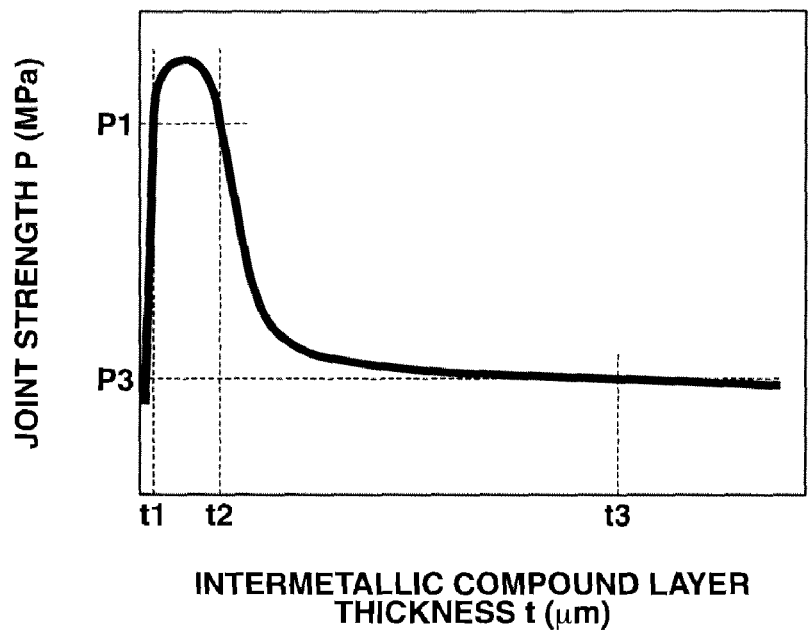
FIGS. 1 and 2 are graphs showing a qualitative relationship between the intermetallic compound layer thickness and the joint strength and a qualitative relationship between the intermetallic compound layer thickness and the amount of heat applied, respectively, in the case where dissimilar metal material are joined together.

The present invention will be described below by way of the following exemplary embodiments, in which like parts and portions are designated by like reference numerals to omit repeated explanations thereof.

According to a dissimilar metal joining method of the present invention, different kinds of first and second metal materials are joined to each other by interposing between the first and second metal materials a third metal material dissimilar to the first and second metal materials and causing eutectic melting at least either at an interface between the first and third metal materials or at an interface between the second and third metal materials.

Figure 2:
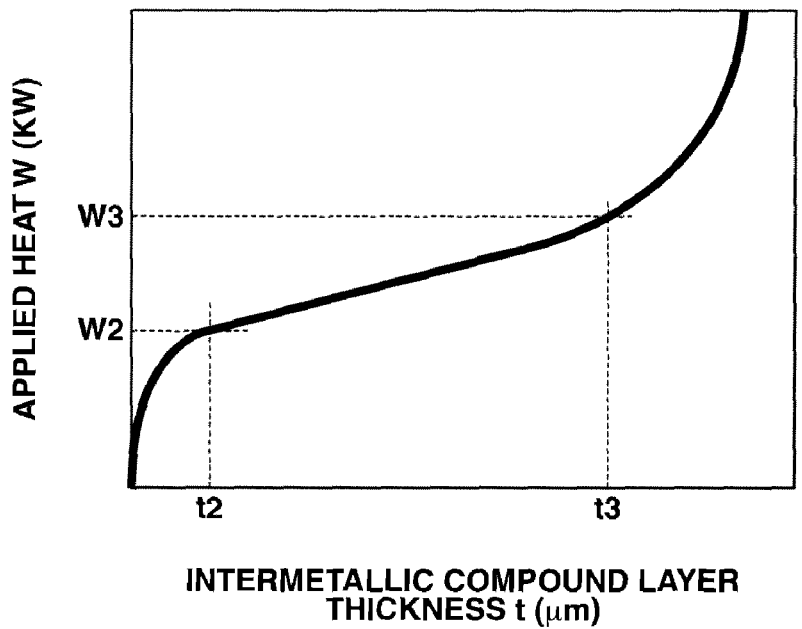

When dissimilar metal materials are joined together, a layer of brittle intermetallic compounds grows at an interface between the dissimilar metal materials so that the strength P of joint between the metal materials varies with the thickness t of the intermetallic compound layer as shown in FIG. 1. The joint strength P is relatively high when the intermetallic compound layer thickness t takes small values from t1 to t2. The joint strength P becomes considerably decreased when the intermetallic compound layer thickness t exceeds t2. In order to secure a sufficient level of joint strength P, it is desirable to limit the intermetallic compound layer thickness t to within the range of t1 to t2, e.g., about 1 to 5 μm. On the other hand, the intermetallic compound layer thickness t generally increases with the amount W of heat applied during the joining as shown in FIG. 2. If either of the metal materials has an oxide film at a joint surface thereof, it is necessary to apply a large amount of heat W3 in order to break and remove the oxide film. The intermetallic compound layer however grows to a great thickness t3 through the application of such a large amount of heat W3, whereby the joint strength P becomes decreased to a low level P3.

The dissimilar metal joining method of the present invention utilizes eutectic melting in which a liquid phase is formed by the interdiffusion of metals (or metal alloys) at the time the interdiffusion region reaches a eutectic composition at a temperature higher than or equal to a eutectic temperature and lower than the melting points of the metals (metal alloys). The oxide film and other impurities can be removed together with the eutectic liquid through the application of a relatively small amount of heat (W2 or less). Further, the eutectic metal functions as an intermediate layer to prevent a direct reaction between the dissimilar metal materials. It is therefore possible in the present invention to control the joint interface temperature to within certain limits higher than or equal to the eutectic temperature and lower than the melting point of the base metal material, limit the growth of the intermetallic compound layer to a small thickness (from t1 to t2) and secure a high level of joint strength (P1 or higher) between the first and second metal materials by the interdiffusion of the component metals.

The metal joining method of the present invention is simplified by applying a covering layer of the third metal material to the first metal material to provide a laminate of the first and third metal materials and then arranging the second metal material on the covering layer of the third metal material of the laminate in such a manner that the second and third metal materials comes into contact with each other, or by applying a covering layer of the third metal material the second metal material to provide a laminate of the second and third metal materials and then arranging the first metal material on the covering layer of the third metal material of the laminate in such a manner that the first and third metal material comes into contact with each other. This makes it possible to reduce the number of operation steps in the metal joining process and increase the efficiency of the metal joining process without the need for the step to insert and hold the third metal material between the first and second metal materials. In this case, the third metal material is preferably applied to a clean surface of the first or second metal material by plating, thermal spraying, vapor deposition or film coating. There arise very clean, fresh joint surfaces upon removal of the eutectic melt, the oxide film and other impurities, thereby enabling a strong joint between the metal materials. For example, a commonly available rust-proof plated metal material such as a zinc-plated steel sheet is usable as a laminar composite of the first and second metal materials or of the second and third metal materials. The use of such a commercially available material allows a further simplification and cost reduction of the metal joining method.

In the present embodiment, the third metal material can be selected from any metal materials (metals and metal alloys) capable of forming a low-melting eutectic with either or both of the first and second metal materials.

Further, any heating means is usable as a heat source to cause the eutectic melting in the present invention. The heating means is not particularly restricted as long as it is capable of controlling a temperature in the interface between the metal materials precisely. Examples of the heating means include an electron beam, a laser beam, resistance heating, high-frequency heating, friction heating and furnace heating. In other words, both of fusion welding (such as electron-beam welding, laser welding, resistance spot welding, resistance seam welding and high-frequency welding) and solid-state welding (such as friction welding, ultrasonic welding and diffusion joining) are applicable to the metal joining method of the present invention. A conventional ordinary heating source can be used as the heating means so as to avoid cost increases without the need to prepare new heating equipment.

The metal joining method of the present invention will be described below by way of the following first to fourth embodiments. It should be however noted that the following embodiments are only illustrative and not intended to limit the invention thereto.

For purposes of explanation, the first and second metal materials specifically refer to steel and aluminum alloy, respectively, in the first to fourth embodiments in view of the fact that steel materials and aluminum alloy materials are often used in combination in the current automotive industry. In this case, any metal material capable forming a eutectic melt with aluminum alloy at a temperature lower than the melting point of aluminum alloy is usable as the third metal material. Examples of such a metal material include zinc (Zn), copper (Cu), tin (Sn), silver (Ag) and nickel (Ni). The third metal material is not limited to the above pure metals. Metal alloys each containing at least one of zinc, copper, tin, silver and nickel are also usable as the third metal material since there are various kinds of eutectic metals including a binary alloy and a ternary alloy. The use of these metals and metal alloys as the third metal material allows a surficial oxide film of the aluminum alloy to be removed at a relatively low temperature. This makes it possible to limit the formation of hard but brittle intermetallic compounds and achieve a strong joint between the steel material and the aluminum alloy material even though the intermetallic compounds are very likely to occur at the joint between the steel and aluminum alloy materials. By way of example, the third metal material specifically refers to zinc previously applied to the steel material so that the eutectic melting is caused between the aluminum and zinc materials in the first to fourth embodiments.

As shown in FIG. 3, the eutectic temperature T0 of an aluminum-zinc binary system, the melting point of aluminum and the melting point of zinc are 655 K, 933 K and 962.5 K, respectively. The eutectic reaction of the aluminum-zinc system occurs at a temperature much lower than the melting points of aluminum and zinc to form a eutectic composition of 5% aluminum and 95% zinc. Namely, the eutectic melting can be caused by contacting clean surfaces of the aluminum alloy and zinc materials with each other, and then, heating the interface between the aluminum alloy and zinc materials to a temperature of 655 K or higher. The eutectic reaction occurs constantly without reference to the system composition, and the amount of the eutectic varies with the system composition.

In practice, the oxide film needs to be removed from the surface of the aluminum alloy material so as to make contact between the aluminum alloy and zinc materials for the eutectic melting. It is thus desirable to cause plastic deformation in the aluminum alloy material through the application of a pressure or thermal impact in such a manner as to produce a local, physical break or rupture of the oxide film due to the frictional displacement between microscopic surface projections of the aluminum alloy and zinc materials. The eutectic melting becomes induced upon contact of the aluminum alloy material and the zinc material through such a local break or rupture of the oxide film. The oxide film becomes broken or ruptured successively and acceleratively as the eutectic liquid phase expands throughout the joint interface. The steel material and the aluminum alloy material are joined together upon removal of the oxide film from between these metal materials.

There is no need to control the system composition because the eutectic composition spontaneously occurs by the inter-diffusion of the system component metals. An essential condition for the eutectic melting is that two different kinds of metals or metal alloys are able to form a low-melting eutectic composition. In the case of using an zinc alloy as the third metal material, it is required that the aluminum-zinc binary system contains 95% or greater zinc so as to allow the eutectic melting between aluminum and zinc.

A metal joining process of the first embodiment will be now described below in detail with reference to FIGS. 4A to 4E.

A steel sheet 1 (as the first metal material) with a zinc plating 3 (as the third metal material) and an aluminum alloy sheet 2 (as the second metal material) are first prepared as shown in FIG. 4A. The steel sheet 1 is a cold-reduced carbon steel sheet SPCC according to JIS G 3141 and has a thickness of 0.55 mm and a width of 3 mm. The zinc plating 3 has a thickness of 6 μm. For process simplification and efficiency improvement, a commonly-available, rust-proof zinc plated steel material sheet SGCC according to JIS G 3302 is used as a laminated composite in which the zinc plating 3 has previously been applied to a clean surface of the steel sheet 1 in the first embodiment. The aluminum alloy sheet 2 is a 6000-series aluminum alloy sheet comprising aluminum, 1.0% of silicon and 0.6% of magnesium according to JIS H 4000 and has a thickness of 1 mm and a width of 10 mm. An oxide film 4 is formed in a surface of the aluminum alloy sheet 2. Although not shown in the drawings, the laminate of the steel sheet 1 and the zinc plating 3 and the aluminum alloy sheet 2 are formed into U-shapes so as to be put together at bottoms of the U-shapes.

As shown in FIG. 4B, the steel sheet 1 with the zinc plating 3 and the aluminum alloy sheet 2 are next laminated together in such a manner that the zinc plating 3 and the oxide film 4 come into contact with each other and heated at a given temperature in an infrared heating furnace under a constant pressure of 5 MPa applied by means of an air cylinder. The furnace temperature is herein set to 773K so that the interface between the aluminum alloy sheet 2 and the zinc plating 3 reaches a eutectic temperature of 655 K.

Then, a local break or rupture 7 occurs in the oxide film 4 as shown in FIG. 4C due to the frictional displacement between microscopic surface projections of the aluminum alloy sheet 2 and the zinc plating 3.

The aluminum alloy sheet 2 and the zinc plating 3 makes a local direct contact via the break or rupture 7 of the oxide film 4, thereby forming an aluminum-zinc eutectic melt 5 as shown in FIG. 4D under the given furnace temperature condition of 773K. When the steel sheet 1 and the aluminum alloy sheet 2 are pressed against each other in this state, the eutectic melt 5, the oxide film 4 and other impurities are discharged from between the steel sheet 1 and the aluminum alloy sheet 2 as indicated by an arrow 8 in FIG. 4D so as to secure clean, fresh joint surfaces of the steel sheet 1 and the aluminum alloy sheet 2.

As shown in FIG. 4E, the steel sheet 1 and the aluminum alloy sheet 2 are then joined directly together at the clean, fresh joint surfaces thereof.

In this way, it is possible in the first embodiment to remove the oxide film 4 from the aluminum alloy sheet 2 at a relatively low temperature, limit the formation of intermetallic compounds and establish a strong joint between the steel sheet 1 and the aluminum alloy sheet 2. No zinc plating 3 remains in the joint between the steel sheet 1 and the aluminum alloy sheet 2 in the first embodiment. In order for the steel sheet 1 and the aluminum alloy sheet 2 to be directly jointed together without the zinc plating 3 being left therebetween, it is preferable to press the steel sheet 1 and the aluminum alloy sheet 2 against each other with a certain degree of pressure and to control the thickness of the zinc plating 3 in such a manner that all the zinc plating 3 becomes consumed in the eutectic melting.

A metal joining process of the second embodiment will be next described below in detail with reference to FIGS. 5A to 5E. The second embodiment is similar to the first embodiment, except that the first and second metal materials are joined together via the third metal material and the eutectic metal.

Figure 5A:
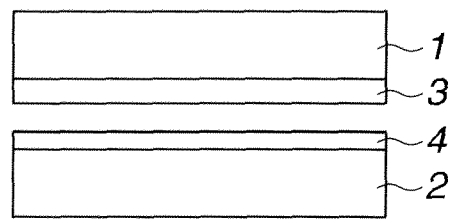
FIGS. 5A to 5E are schematic views showing how a dissimilar metal joining process proceeds according to a second embodiment of the invention.

As shown in FIG. 5A, a steel sheet 1 (as the first metal material) with a zinc plating 3 (as the third metal material) and an aluminum alloy sheet 2 (as the second metal material) are first prepared. The steel sheet 1 is a cold-reduced carbon steel sheet SPCC according to JIS G 3141 and has a thickness of 0.55 mm and a width of 3 mm. The zinc plating 3 has a thickness of 20 μm. A commonly-available, rust-proof zinc plated steel material sheet SGCC according to JIS G 3302 is also used as a laminated composite in which the zinc plating 3 has previously been applied to a clean surface of the steel sheet 1 in the second embodiment for process simplification and efficiency improvement. The aluminum alloy sheet 2 is a 6000-series aluminum alloy sheet comprising aluminum, 1.0% of silicon and 0.6% of magnesium according to JIS H 4000 and has a thickness of 1 mm and a width of 10 mm. An oxide film 4 is formed in a surface of the aluminum alloy sheet 2. The laminate of the steel sheet 1 and the zinc plating 3 and the aluminum alloy sheet 2 are also formed into U-shapes so as to be put together at bottoms of the U-shapes although not so shown in the drawings.

Figure 5B:
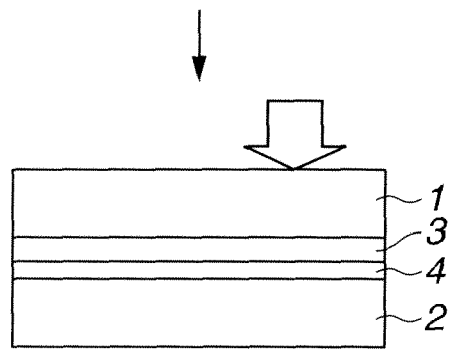

As shown in FIG. 5B, the steel sheet 1 with the zinc plating 3 and the aluminum alloy sheet 2 are next laminated together in such a manner that the zinc plating 3 and the oxide film 4 come into contact with each other and heated at a given temperature in an infrared heating furnace under a constant pressure of 10 MPa applied by means of an air cylinder. The furnace temperature is also set to 773K so that the interface between the aluminum alloy sheet 2 and the zinc plating 3 reaches a eutectic temperature of 655 K in the second embodiment.

Figure 5C:
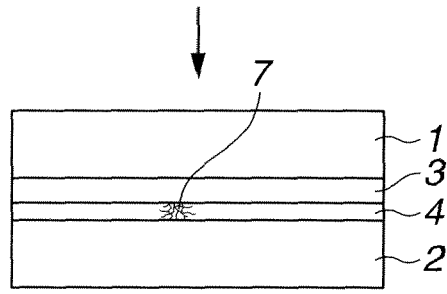

Then, a local break or rupture 7 occurs in the oxide film 4 as shown in FIG. 5C due to the frictional displacement between microscopic surface projections of the aluminum alloy sheet 2 and the zinc plating 3.

Figure 5D:
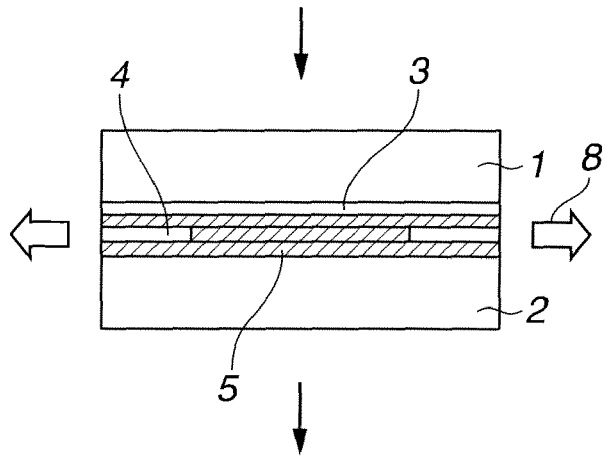

The aluminum alloy sheet 2 and the zinc plating 3 makes a local direct contact via the break or rupture 7 of the oxide film 4, thereby forming an aluminum-zinc eutectic melt 5 as shown in FIG. 5D under the given furnace temperature condition of 773K. When the steel sheet 1 and the aluminum alloy sheet 2 are pressed against each other in this state, the eutectic melt 5, the oxide film layer 4 and other impurities are discharged from between the steel sheet 1 and the aluminum alloy sheet 2 as indicated by an arrow 8 in FIG. 5D with some of the zinc plating 3 and the eutectic melt 5 left between the steel sheet 1 and the aluminum alloy sheet 2. The melt 5 solidifies into a eutectic metal composite 6 when cooled.

Figure 5E:
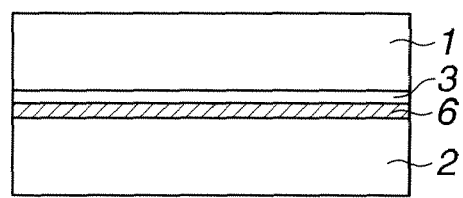

As shown in FIG. 5E, the steel sheet 1 and the aluminum alloy sheet 2 are joined together via the zinc plating 3, the eutectic solid 6 and interfacial interdiffusion layers.

In the second embodiment, the zinc plating 3 and the eutectic solid 6 exist to fill in microscopic gaps of the joint between the steel sheet 1 and the aluminum alloy sheet 2, so that the joint between the steel sheet 1 and the aluminum alloy sheet 2 is made uniform to provide a substantial increase in joint surface area. It is therefore possible in the second embodiment to establish a strong joint between the steel sheet 1 and the aluminum alloy sheet 2. In order for the steel sheet 1 and the aluminum alloy sheet 2 to be joined together with some of the zinc plating 3 and the eutectic metal 6 left therebetween, it is preferable to press the steel sheet 1 and the aluminum alloy sheet 2 against each other with a relatively low pressure and adjust the zinc plating 3 to a relatively large thickness.

A metal joining process of the third embodiment will be described below in detail with reference to FIGS. 6 and 7A to 7E. The third embodiment is similar to the first and second embodiments, except that the eutectic melting is caused by laser spot welding.

The laser spot welding is performed by irradiating a high-energy beam from one material side to form a spot of the high-energy beam on either of the first and second metal materials in the third embodiment.

It is herein preferable during the irradiation of the high-energy beam to exert a pressure on the metal material at a position around the beam spot in such a manner as to press the first and second metal materials against each other and bring the oxide film into intimate contact with the third metal material. When the metal materials are held in intimate contact with each other, the oxide film is more likely to be broken or ruptured by the frictional displacement between the metal materials due to thermal expansion under the irradiation of the high-energy beam. The eutectic melting is thus promoted effectively upon the occurrence of such a break or rupture of the oxide film. This makes it possible to control the joint interface temperature to a relatively low temperature so as to limit the formation of the intermetallic compounds and form a strong joint between the metal materials.

The type of the high-energy beam is not particularly restricted. A semiconductor laser beam and a defocused YAG laser beam are usable as the high-energy beam so as to form a larger spot and secure a wider heating area. When the heating area is wide, the joint interface temperature can be kept uniform so as to achieve a higher joint strength between the metal materials.

Further, the laser beam is preferably irradiated onto one of the first and second metal materials having a higher melting point so as to cause eutectic melting at least at the interface between the other of the first and second metal materials having a lower melting point and the third metal material by the conduction of heat through the high-melting point material. Such beam irradiation allows melting of the low-melting point material while preventing melting of the high-melting point material. The formation of the intermetallic compounds can be thus limited effectively for improvement in joint strength between the metal materials.

It is also preferable to bring heat discharge (radiation) means in contact with either of the first and second metal materials having a lower melting point so as to ensure stability in the quality of the low-melting point material.

Figure 7A:
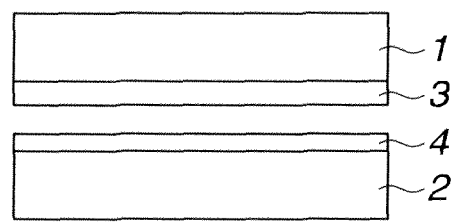
FIGS. 7A to 7E are schematic views showing how a dissimilar metal joining process proceeds according to the third embodiment of the invention.

More specifically, a steel sheet 1 (as the first metal material) with a zinc plating 3 (as the third metal material) and an aluminum alloy sheet 2 (as the second metal material) are first prepared as shown in FIG. 7A. The steel sheet 1 is a cold-reduced carbon steel sheet SPCC according to JIS G 3141 and has a thickness of 0.55 mm. The zinc plating 3 has a thickness of 6 μm. A commonly-available, rust-proof zinc plated steel material sheet SGCC according to JIS G 3302 is also used as a laminated composite in which the zinc plating 3 has previously been applied to a clean surface of the steel sheet 1 in the third embodiment for process simplification and efficiency improvement. The aluminum alloy sheet 2 is a 6000-series aluminum alloy sheet comprising aluminum, 1.0% of silicon and 0.6% of magnesium according to JIS H 4000 and has a thickness of 1 mm. An oxide film 4 is formed in a surface of the aluminum alloy sheet 2. Each of the materials 1, 2 and 3 has a size of 75 mm×20 mm in the third embodiment.

Figure 6:
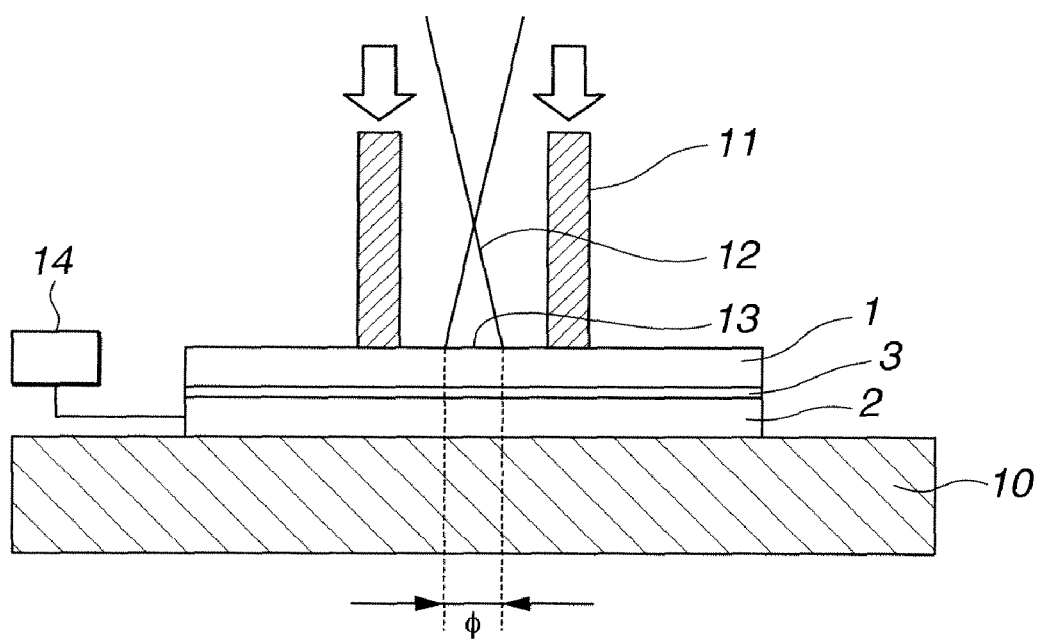
FIG. 6 is a schematic view of dissimilar metal joining equipment according to a third embodiment of the invention.
Figure 7B:
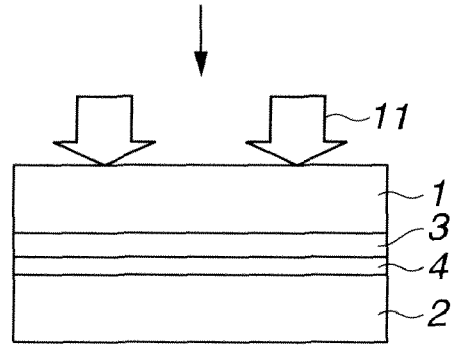

As shown in FIGS. 6 and 7B, the steel sheet 1 with the zinc plating 3 and the aluminum alloy sheet 2 are laminated together with a lap width of 20 mm in such a manner that the zinc plating 3 and the oxide film 4 come into contact with each other and then fixed on a base plate 10 with the steel sheet 1 facing upward.

The laminate of the steel sheet 1, the zinc plating 3 and the aluminum alloy sheet 2 is then irradiated with a YAG laser beam 12, as shown in FIG. 6, under a condition that a pressure is applied to the laminate via a pressure ring 11 to press the steel sheet 1 against the aluminum alloy sheet 2. Herein, the steel sheet 1 has a melting point higher than that of the aluminum sheet 2. The laser beam 12 is thus irradiated from the steel sheet side to form a beam spot 13 on the steel sheet 1 at around the center of the laminate. The pressure ring 11 is placed to surround the beam spot 13 and fastened to the base plate 10 using bolts so that the pressure ring 11 also functions as a jig for holding the steel sheet 1, the zinc plating and the aluminum alloy sheet 2 onto the base plate 10 and thereby bringing the zinc plating 3 into intimate contact with the oxide film 4. A heat discharger (radiator) 14 may preferably be held in contact with the aluminum alloy sheet 2 as shown in FIG. 6 in order to maintain stable quality of the aluminum alloy sheet 2 of lower melting point.

The irradiation conditions such as the power and irradiation time and the diameter ϕ of the beam spot 13 of the YAG laser beam 12 are controlled so as to cause eutectic melting at the interface between the aluminum alloy sheet 2 and the zinc plating 3 by the conduction of heat through the steel sheet 1. The steel sheet 1 is prevented from melting under the irradiation of the YAG laser beam 12 in order to avoid the formation of the intermetallic compounds between the steel sheet 1 and the aluminum alloy sheet 2. The laser beam 12 is generated using a YAG laser oscillator with a maximum laser power output of 3 kW and a lens with a focal length of 100 mm. During the irradiation of the laser beam 12, shielding is provided by ejecting argon gas at a flow rate of 20 L/min through a nozzle (coaxial with the laser beam 12). In the third embodiment, the power and irradiation time of the laser beam 12 are 1.5 kW and 1.4 seconds, respectively. Further, the laser beam 12 is defocused in such a manner that the beam spot 13 has a diameter ϕ of 7 mm on the steel sheet 1 so as to ensure a wide heating area, a uniform joint interface temperature and a high joint strength the in the third embodiment. A semiconductor laser beam may alternatively be used in place of the defocused YAG laser beam 12. The same effect can be obtained even by using the semiconductor laser beam in place of the defocused YAG laser beam 12.

Figure 7C:
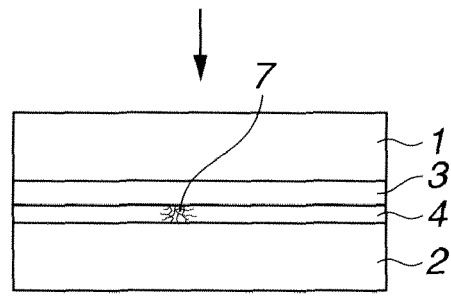

Under the irradiation of the YAG laser beam 12, there arises a relative displacement between the aluminum alloy material 2 and the zinc plating 3 due to material thermal expansion to cause a break or rupture 7 of the oxide film 4 as shown in FIG. 7C.

Figure 7D:
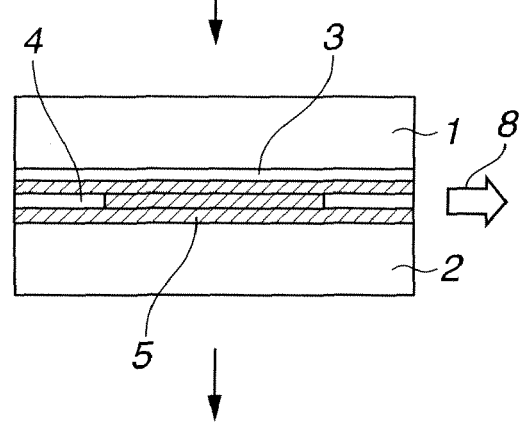

The aluminum alloy sheet 2 and the zinc plating 3 makes a local direct contact via the break or rupture 7 of the oxide film 4, thereby forming an aluminum-zinc eutectic melt 5 as shown in FIG. 7D under the given temperature condition. The eutectic melt 5 grows between the aluminum alloy sheet 2 and the zinc plating 3, and then, the eutectic melt 5, the oxide film layer 4 and other impurities are discharged from between the steel sheet 1 and the aluminum alloy sheet 2 as indicated by an arrow 8 in FIG. 7D with some of the zinc plating 3 and the eutectic melt 5 left between the steel sheet 1 and the aluminum alloy sheet 2. The melt 5 solidifies into a eutectic metal composite 6 when cooled.

Figure 7E:
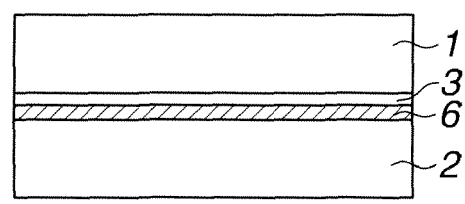

As shown in FIG. 7E, the steel sheet 1 and the aluminum alloy sheet 2 are joined together via the zinc plating 3, the eutectic solid 6 and interfacial interdiffusion layers.

In this way, it is possible in the third embodiment to remove the oxide film 4 at a relatively low temperature, limit the formation of the intermetallic compounds and then establish a strong joint between the steel sheet 1 and the aluminum alloy sheet 2.

Finally, the fourth embodiment will be described below in detail with reference to FIGS. 8, 9A to 9E, 10A and 10B. The fourth embodiment is also similar to the first to third embodiments, except that the eutectic melting is caused by resistance spot welding.

The resistance spot welding is performed by holding the metal materials between a pair of electrodes under pressure and flowing a current between the electrodes in the fourth embodiment. Preferably, at least one of tips of the electrodes has a curved end such as a semispherical end held in contact with the metal material. Such an electrode form is effective in causing a break or rupture of the oxide film, removing the oxide film together with the eutectic melt. This makes it thus possible to form a strong joint between the fresh, clean joint surfaces of the metal materials.

Figure 9A:
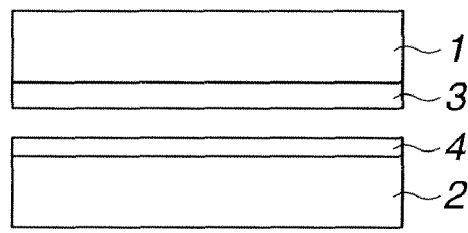
FIGS. 9A to 9E are schematic views showing how a dissimilar metal joining process proceeds according to the fourth embodiment of the invention.

More specifically, a steel sheet 1 (as the first metal material) with a zinc plating 3 (as the third metal material) and an aluminum alloy sheet 2 (as the second metal material) are first prepared as shown in FIG. 9A. The steel sheet 1 is a cold-reduced carbon steel sheet SPCC according to JIS G 3141 and has a thickness of 0.55 mm. The zinc plating 3 has a thickness of 6 μm. A commonly-available, rust-proof zinc plated steel material sheet SGCC according to JIS G 3302 is also used as a laminated composite in which the zinc plating 3 has previously been applied to a clean surface of the steel sheet 1 in the fourth embodiment for process simplification and efficiency improvement. The aluminum alloy sheet 2 is a 6000-series aluminum alloy sheet comprising aluminum, 1.0% of silicon and 0.6% of magnesium according to JIS H 4000 and has a thickness of 1 mm. An oxide film 4 is formed in a surface of the aluminum alloy sheet 2. Each of the materials 1, 2 and 3 is controlled to a size of 75 mm×20 mm according to JIS Z 3136 in the fourth embodiment.

Figure 8:
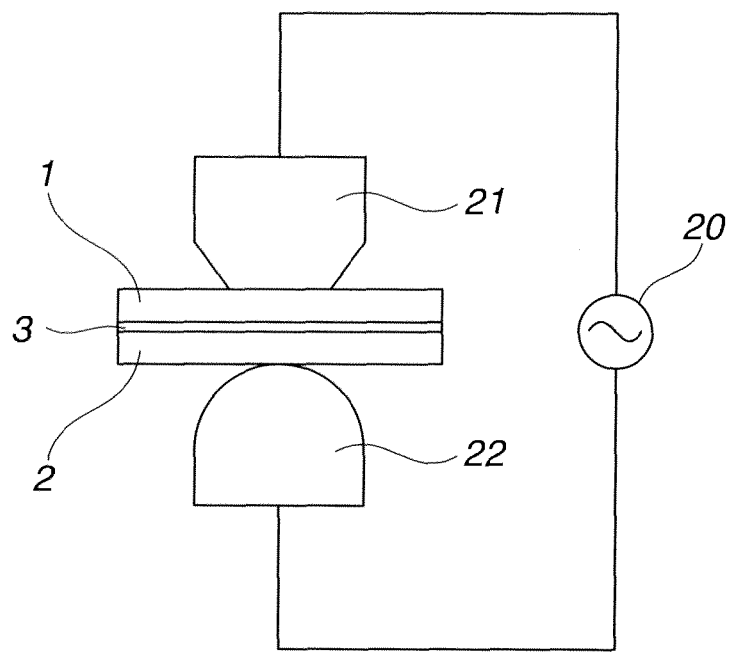
FIG. 8 is a schematic view of dissimilar metal joining equipment according to a fourth embodiment of the invention.
Figure 10A:
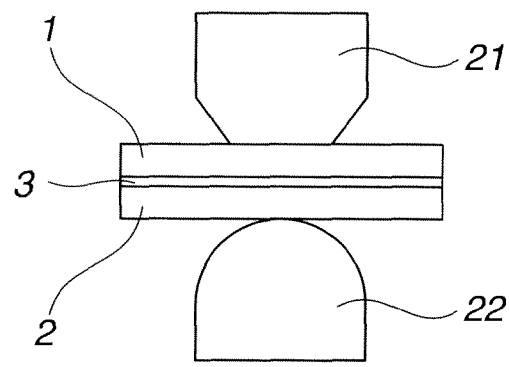
FIGS. 10A and 10B are schematic diagrams of electrode pairs used in dissimilar metal joining according to the fourth embodiment of the invention and the earlier technology, respectively.
Figure 9B:
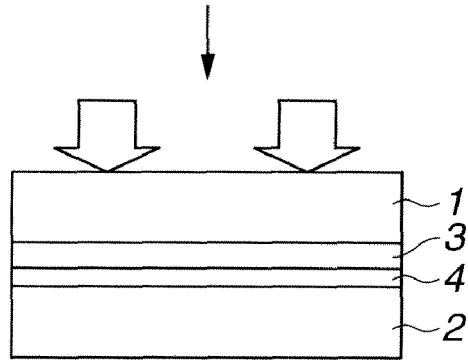

As shown in FIGS. 8 and 9B, the steel sheet 1 with the zinc plating 3 and the aluminum alloy sheet 2 are laminated together with a lap width 20 mm in such a manner that the zinc plating 3 and the oxide film 4 come into contact with each other and held with a pressure of 120 kgf between upper and lower electrodes 21 and 22 in a resistance spot welding with an alternating-current power source 10. In the fourth embodiment, the upper electrode 21 has a conical frustum shape with a flat face thereof held in contact with the steel sheet 1 of higher melting point, and the lower electrode 22 has a domical (semispherical) end with a curved face thereof held in contact with the aluminum alloy sheet 2 of lower melting point, as shown in FIGS. 8 and 10A. With the supply of current from the power source 10 to the electrodes 21 and 22, the laminate of the steel sheet 1, the zinc plating 3 and the aluminum alloy sheet 2 is subjected to spot resistance welding.

Figure 9C:
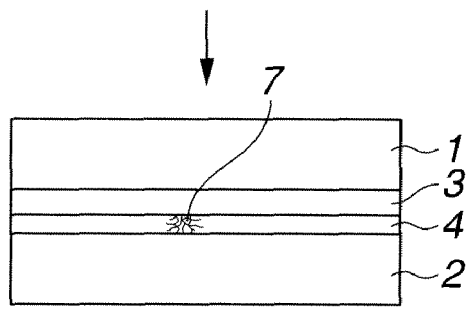

Then, there arises a relative displacement between the aluminum alloy material 2 and the zinc plating 3 due to material thermal expansion to cause a break or rupture 7 of the oxide film 4 as shown in FIG. 9C.

Figure 9D:
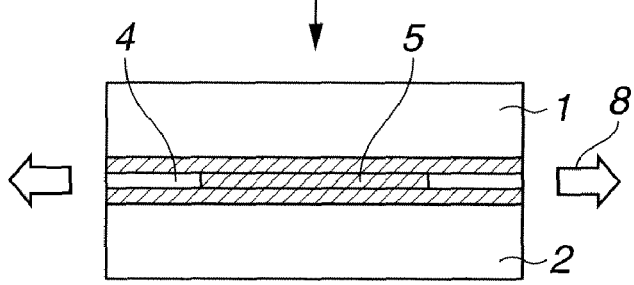

The aluminum alloy sheet 2 and the zinc plating 3 makes a local direct contact via the break or rupture 7 of the oxide film 4, thereby forming an aluminum-zinc eutectic melt 5 as shown in FIG. 9D under the given temperature condition. The eutectic melt 5, the oxide film layer 4 and other impurities are discharged from between the steel sheet 1 and the aluminum alloy sheet 2 as indicated by an arrow 8 in FIG. 9D so as to secure clean, fresh joint surfaces of the steel sheet 1 and the aluminum alloy sheet 2.

Figure 9E:
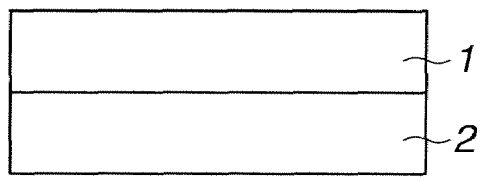

The steel sheet 1 and the aluminum alloy sheet 2 are then directly joined together at the clean, fresh joint surfaces thereof as shown in FIG. 9E.

Figure 10B:
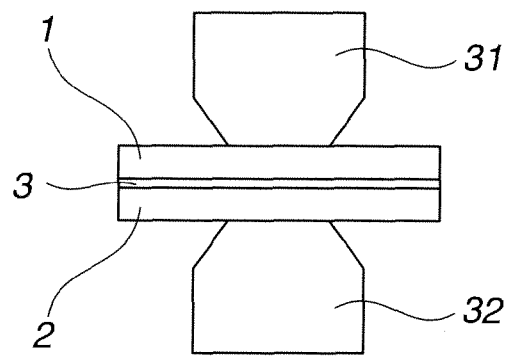

As a comparative example, a steel sheet 1 with a zinc plating 3 is joined to an aluminum alloy sheet 2 under the same conditions as in the fourth embodiment except for the use of a pair of conical frustum shaped electrodes 31 and 32 as shown in FIG. 10B. The joining conditions and joint strength test results of the fourth embodiment and the comparative example are summarized in TABLE.

The eutectic melting occurs in both of the fourth embodiment and the comparative example. In the comparative example, however, an oxide film of the aluminum alloy sheet 2 cannot be removed favorably together with a eutectic melt, thereby resulting in an insufficient joint strength between the steel sheet 1 and the aluminum alloy sheet 2. On the other hand, the oxide film 4 and the eutectic melt 5 can be removed from between the steel sheet 1 and the aluminum alloy sheet 2 very favorably in the fourth embodiment. It is therefore possible in the fourth embodiment to remove the oxide film 4 at a relatively low temperature, limit the formation of the intermetallic compounds and then attain a high joint strength between the steel sheet 1 and the aluminum alloy sheet 2. As a matter of course, the use of a pair of domical electrodes in the resistance spot welding is also effective in causing the eutectic melting and removing the oxide film.

TABLE

|  | Fourth Embodiment | Comparative Example |
|---|---|---|
| Electrode form | conical frustum end + domical end | conical frustum end + conical frustum end |
| Joint strength | high | not high |
| Break/Rupture position | aluminum alloy side | steel side |
| Removal of eutectic melt, zinc plating and oxide film | good | bad |

Although steel materials and aluminum alloy materials are often used in combination in the automotive industry, the combined use of steel materials and calcium materials and the combined use of aluminum alloy materials and calcium materials are conceivable in the future. The present invention is applicable to the joining of a steel material and a calcium material and the joining of an aluminum alloy material and a calcium material. In the case of using the steel and calcium materials are used as the first and second metal materials, zinc and silver materials are usable as the third metal material. In the case of using the aluminum alloy and calcium material as the first and second metal materials, zinc and silver materials are usable as the third metal material.

The entire contents of Japanese Patent Application No. 2004-373381 (filed on Dec. 24, 2004), No. 2004-373389 (filed on Dec. 24, 2004) and No. 2004-373400 (filed on Dec. 24, 2004) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A method for joining first and second dissimilar metal materials, comprising:
    interposing between the first and second metal materials a third metal material dissimilar to the first and second metal materials; and
    performing resistance spot welding on the first, second and third metal materials with application of a pressure so as to break or rupture an oxide film of a surface of the second metal material and cause an eutectic melt between the second and third metal materials,
    wherein said performing includes discharging the eutectic melt together with the oxide film from between the first and second metal materials such that first and second metal materials are joined directly together at clean surfaces thereof.

2. The method of claim 1, wherein said interposing comprises:
    providing a covering layer of the third metal material on the first metal material; and
    arranging the second metal material on the covering layer of the third metal material in such a manner that the third metal material comes into contact with the second metal material.

3. The method of claim 2, wherein the third metal material is a metal plating on the first metal material.

4. The method of claim 3, wherein the first metal material is a steel material and the third metal material is a zinc plating on the steel material.

5. The method of claim 1, wherein the first metal material is a steel material, the second metal material is an aluminum alloy material and the third metal material is a material capable of forming a low melting eutectic with the aluminum alloy material.

6. The method of claim 1, wherein said resistance spot welding is performed by holding the metal materials between a pair of electrodes; and at least one of tips of the electrodes has a curved surface held in contact with the metal material.

\* \* \* \* \*